United States Patent [19]
Northam

[11] Patent Number: 5,884,550
[45] Date of Patent: Mar. 23, 1999

[54] INTEGRAL RING CARBON-CARBON PISTON

[75] Inventor: G. Burton Northam, Carrollton, Va.

[73] Assignee: The United States of America as represented by the Administrator of the National Aeronautics and Space Administration, Washington, D.C.

[21] Appl. No.: 815,535

[22] Filed: Mar. 12, 1997

Related U.S. Application Data

[60] Provisional application No. 60/014,187 Mar. 13, 1996.
[51] Int. Cl.⁶ .......................................................... F16J 1/04
[52] U.S. Cl. ............................... 92/212; 92/222; 92/240; 92/249
[58] Field of Search .............................. 92/208, 212, 213, 92/222, 234, 225, 235, 240, 242, 248, 249

[56] References Cited

U.S. PATENT DOCUMENTS

| | | | |
|---|---|---|---|
| 1,687,837 | 10/1928 | Hoecker | ..................................... 82/235 |
| 2,104,350 | 1/1938 | Nelson | ................................... 92/234 X |
| 3,994,208 | 11/1976 | Boyer | ..................................... 92/240 X |
| 4,643,078 | 2/1987 | Ban | ........................................ 92/213 X |
| 4,683,808 | 8/1987 | Wacker et al. | ............................. 92/208 |
| 4,683,809 | 8/1987 | Taylor . | |
| 4,736,676 | 4/1988 | Taylor . | |
| 4,909,133 | 3/1990 | Taylor et al. | .............................. 92/212 |
| 5,083,537 | 1/1992 | Onofrio et al. . | |
| 5,146,883 | 9/1992 | Reipert et al. | ......................... 92/212 X |
| 5,370,087 | 12/1994 | Guimond et al. . | |
| 5,687,634 | 11/1997 | Ransome | ................................. 92/170.1 |

*Primary Examiner*—Hoang Nguyen
*Attorney, Agent, or Firm*—Kurt G. Hammerle

[57] ABSTRACT

An improved structure for a reciprocating internal combustion engine or compressor piston fabricated from carbon-carbon composite materials is disclosed. An integral ring carbon-carbon composite piston, disclosed herein, reduces the need for piston rings and for small clearances by providing a small, flexible, integral component around the piston that allows for variation in clearance due to manufacturing tolerances, distortion due to pressure and thermal loads, and variation in thermal expansion differences between the piston and the cylinder liner.

28 Claims, 3 Drawing Sheets

INTEGRAL RING CARBON-CARBON PISTON

ORIGIN OF THE INVENTION

The invention described herein was made by an employee of the United States Government and may be manufactured and used by or for the Government for governmental purposes without the payment of any royalties thereon or therefor.

CLAIM OF BENEFIT OF PROVISIONAL APPLICATION

Pursuant to 35 U.S.C. §119, the benefit of priority from provisional application 60/014,187, with a filing date of Mar. 13, 1996 is claimed for this non-provisional application.

BACKGROUND OF THE INVENTION

1. Field of the Invention

This invention relates to the lightweight design of an improved reciprocating piston for an internal combustion engine and/or compressor, and more specifically to improved structures for an integral ring piston fabricated from carbon-carbon composite materials.

2. Description of the Related Art

Internal combustion, reciprocating engines used in aerospace, military, and transportation applications and compressors should be lightweight and capable of operating at elevated temperatures.

Conventional internal combustion engines and compressors employ pistons fabricated from cast-iron, steel, or aluminum alloys. In many applications, aluminum alloy pistons have replaced steel and cast-iron pistons because they are lighter and their use has a dramatic effect on reducing total engine weight. However, aluminum alloy pistons used in high speed airplane engines and lightweight diesel engines frequently fail due to severe thermal loads at elevated engine operating temperatures, i.e. above 600 degrees Fahrenheit (F).

Additionally, the high thermal conductivity and high specific heat of cast-iron and steel pistons result in considerable "through-the-wall" heat loss. Such heat loss reduces engine and compressor operating efficiency, especially with diesel engines.

Further, conventional pistons fabricated from steel or aluminum alloy have relatively high coefficients of thermal expansion, i.e. they expand when heated. To account for thermal expansion, a small clearance between the piston and the cylinder liner is required. This clearance creates a gap through which compression gases "blow by" the piston thereby polluting the environment and reducing engine operating efficiency. To arrest "blow by," conventional pistons employ a plurality of piston rings to seal the gap.

SUMMARY OF THE INVENTION

Carbon-carbon composite materials, as used herein, refer to a predominantly carbon matrix material reinforced with predominantly carbon fibers, and are well known to the art. The properties of these materials may be tailored to produce desired mechanical and physical properties by preferred orientation of the continuous or staple fibers in the composite; and/or by the selection of additives; and/or by thermal treatment of the fibers and matrix before, during, or after fabrication. Carbon-carbon composite materials may be cast, molded, or laid up, and are machineable. The surface or near-surface material can also be treated and/or coated with oxidation protection or sealing materials.

Carbon-carbon composite materials were developed for high temperature and high strength aerospace applications. Carbon-carbon composites are inherently lightweight; maintain their strength at elevated temperatures (i.e. up to 1500 degrees F); and can be manufactured with low coefficients of thermal expansion, low specific heat, and tailorable thermal conductivity. Current aerospace application of carbon-carbon composite materials includes use as heat-shield material on advanced aerospace vehicles.

Non-aerospace applications have been suggested due to the many mechanical and physical advantages of carbon-carbon composite materials. Current non-aerospace applications include brakes and clutches for high-performance automobiles and in brakes for aircraft. Taylor et al. (U.S. Pat. No. 4,683,809) first addressed manufacturing engine and compressor pistons from carbon-carbon composite materials. However, Taylor et al. recognized that even carbon-carbon composite pistons with low coefficients of thermal expansion require extremely small clearances between the piston and cylinder liner. Such extremely small clearances necessitate machining and grinding the piston and cylinder liner with exacting precision, which is an expensive and time intensive process.

The aforementioned properties associated with carbon-carbon composite materials and a need for a ringless piston which can be manufactured more cheaply, and which, during operation, has no clearance between itself and the cylinder liner, make an integral ring piston, i.e. a reciprocating piston manufactured with a cantilevered seal in its crown and/or skirt, fabricated from carbon-carbon composite materials desirable.

Engines and compressors equipped with an integral ring piston fabricated from carbon-carbon-composite materials will reduce engine weight, which improves fuel efficiency and overall engine and/or compressor performance; reduce the loss of engine and/or compressor performance due to gas "blow by;" reduce cooling requirements due to the ability of carbon-carbon composite pistons to operate at higher temperatures without a loss of strength; reduce heat loss, which improves engine operating efficiency; eliminate the need for piston rings as a means of minimizing gas "blow by;" reduce the emission of hydrocarbons into the atmosphere during "blow by;" and reduce the requirement to maintain extremely small clearances and close tolerances between pistons and cylinder liners during manufacture.

Accordingly, an object of this invention is to reduce the weight of an internal combustion engine and/ or compressor.

It is another object of the present invention to provide an engine and/or compressor with improved acceleration and fuel efficiency, due to reduced compression gas "blow by."

Another object of the invention to provide an engine and/or compressor which improves engine-cycle operating efficiency by reducing "through-the-wall" heat loss.

It is a further object of the invention to provide an engine and/or compressor piston which does not require piston rings.

It is yet another object of the invention to provide an engine and/or compressor which reduces the emission of hydrocarbons into the atmosphere.

It is still a further object of this invention to provide an engine and/or compressor which requires minimal cooling means due to its ability to operate at higher temperatures without a loss of strength.

It is an additional object of this invention to provide an engine and/or compressor which does not require maintenance of strict tolerances and small clearances between pistons and cylinder liners during manufacture.

According to the present invention, the foregoing and additional objects are attained by equipping an internal combustion engine and/or compressor with a reciprocating, integral ring piston which has been fabricated from molded, cast, woven, or chopped-fiber carbon-carbon composite materials.

DETAILED DESCRIPTION OF THE PREFERRED EMBODIMENT

Figure 1:
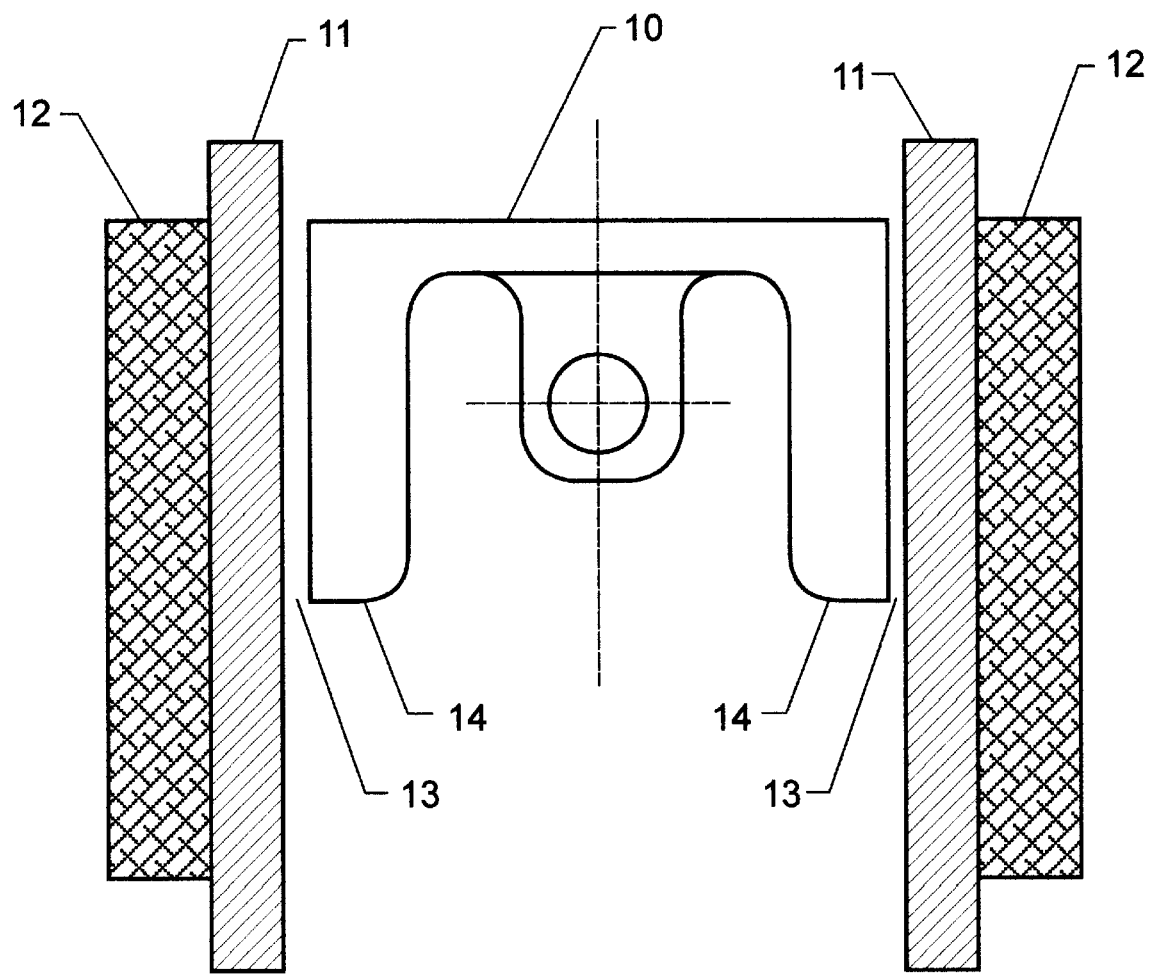
FIG. 1 is an illustration of a prior art reciprocating carbon-carbon composite engine piston.

The invention comprises an improvement in the structure of a reciprocating piston for an internal combustion engine and/or compressor, with said improvement achieved by manufacturing an integral ring piston fabricated from lightweight carbon-carbon composite materials. FIG. 1 depicts a prior art, reciprocating carbon-carbon composite piston 10 installed in a carbon-carbon composite liner 11 in an engine block 12. The clearance 13 between the skirt 14 of the carbon-carbon composite piston 10 and the carbon-carbon composite liner 11 may range from 0.0001 to 0.001 inches depending on the dimensions and operating speed of the piston 10; on the relative thermal expansion and mechanical distortion of the piston 10 with respect to the liner 11; as well as on the initial "fit" of the piston 10 in the bore. This "fit" is achieved by lapping and grinding the piston 10 and cylinder liner 11 so that the piston 10 precisely fits the liner bore 11. Said lapping and grinding are expensive and time-consuming processes which increase manufacturing costs considerably. Under operating conditions, a precise clearance remains difficult to maintain due to differences in orientation of fibers, physical thickness, elastic moduli, and/or coefficients of thermal expansion. As the clearance 13 increases, greater "blow by" and pollution results.

Figure 2:
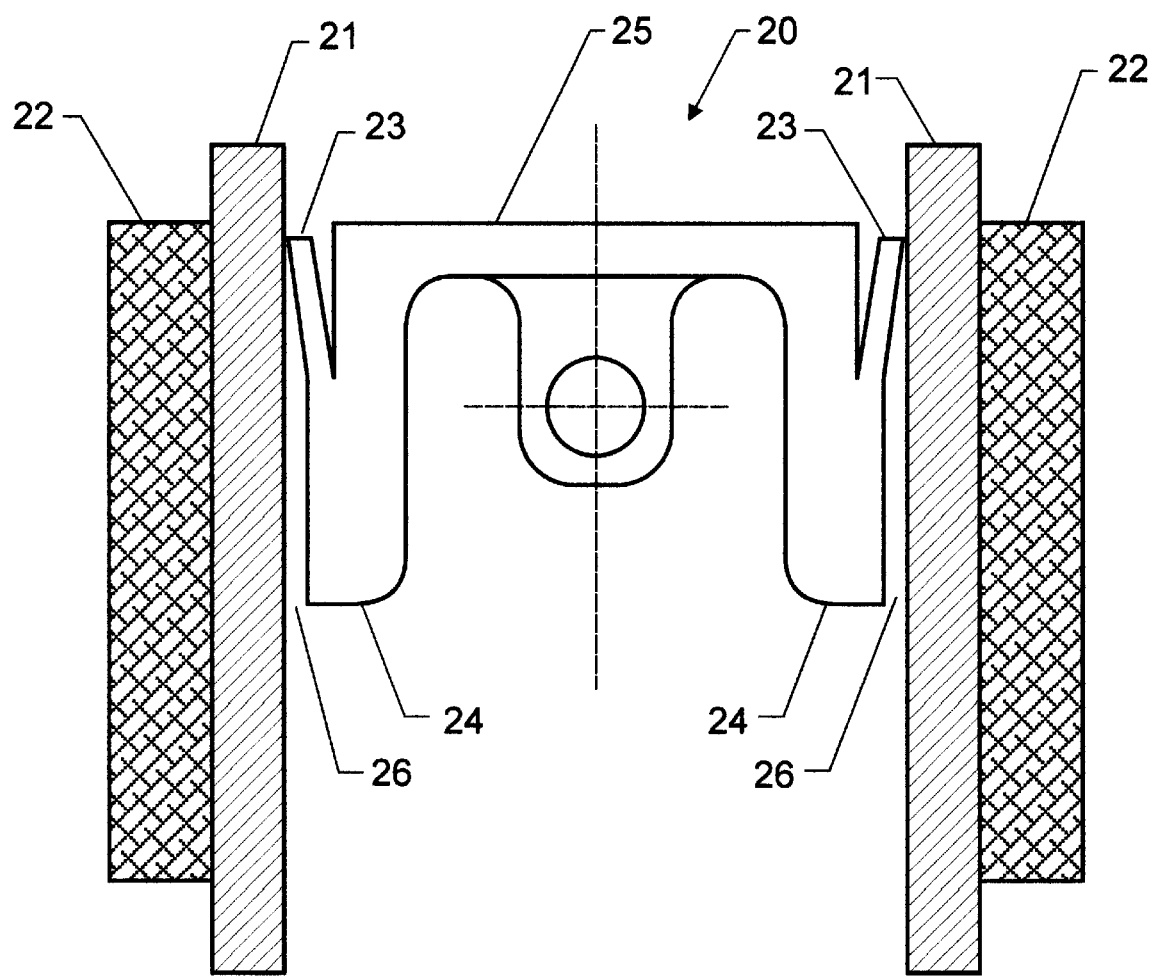
FIG. 2 is an illustration of a reciprocating integral ring piston fabricated from carbon-carbon composite materials.

FIG. 2 depicts a reciprocating, integral ring piston 20 installed in a carbon-carbon composite liner 21 in an engine block 22. A cantilevered seal 23 slightly larger that the dimension of the piston skirt 24, i.e. by approximately 0.001 to 0.003 in., is incorporated circumferentially in the crown 25 of the piston 20. The clearance 26 between the piston skirt 24 and the liner 21 allows slight compression of the cantilevered seal 23 during initial installation of the piston 20 in the liner 21. During engine operation, as pressure increases on the piston crown 25 resulting either from combustion (for an internal combustion engine) or gas pressure (for a compressor), a force is exerted on the cantilevered seal 23 which causes the cantilevered seal 23 to press against and maintain contact with the liner 21 thereby more effectively sealing the liner 21. This seal minimizes "blow by" of combustion gases.

Since the integral ring piston 20 is slightly flexible, an effective seal is maintained continuously despite thermal and mechanical distortions between the piston 20 and the liner 21. Also, because the seal is at the very top of the piston 20, there is no "crevice volume," which is defined as the volume of gas contained between the cylinder liner 21, the piston 20, and the top of the uppermost piston ring (not shown). Crevice volume is a major source of pollution.

To reduce the coefficient of friction between the liner 21 and the integral ring piston 20 and/or cantilevered seal 23, and to improve the wear resistance of the carbon-carbon composite materials, the liner 21 and seal 23 should be coated with ceramic materials such as silicone carbide, titanium carbide, or chromium carbide. Additionally, the inherent porosity of carbon-carbon composite materials allows storage of solid lubricants such as graphite to permit self-lubrication at high temperatures.

Figure 3A:
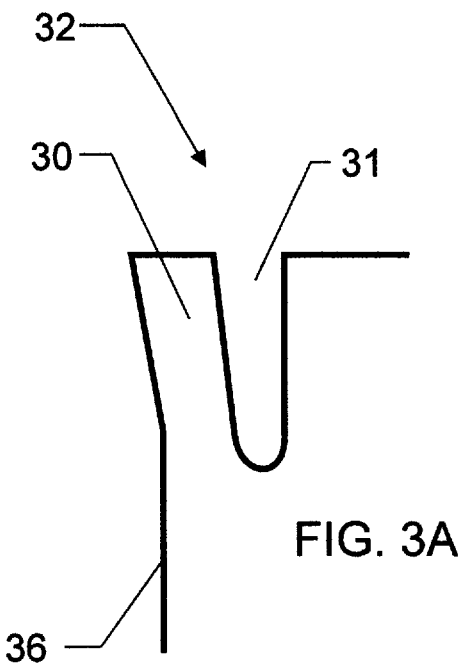
FIG. 3 is an illustration of details for an integral ring groove and cantilevered seal.
Figure 3B:
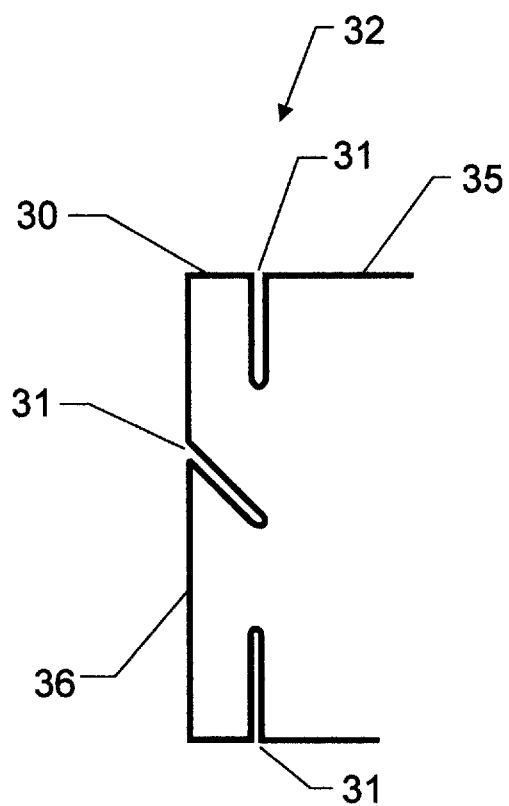

FIG. 3 illustrates the details of an integral ring groove 31 and cantilevered seal 30. In FIG. 3A, an integral ring groove 31 can be machined into a previously manufactured carbon-carbon composite piston 32, to create a cantilevered seal 30; or, alternately, the integral ring groove 31 and cantilevered seal 30 can be cast or molded into the piston 32 as a step in the manufacturing process. An alternate embodiment shown in FIG. 3B involves inserting nylon shims (not shown) where desired in the piston crown 35 and/or piston skirt 36 during lay-up, molding, or casting. As nylon has a lower vaporization temperature than carbon, the nylon will incinerate during carbonization and/or pyrolization, leaving an integral ring groove 31 and cantilevered seal 30.

Typically, an integral ring groove 31 ⅛ in. wide and ¼ in. deep is sufficient to ensure a proper seal. The diameter of the cantilevered seal 30 should exceed the diameter of the piston skirt (not shown) by 0.001 to 0.003 in.

To effect a tighter seal, the cantilevered seal 30 is manufactured so that it has a higher coefficient of thermal expansion (CTE) and/or lower mechanical modulus than the rest of the piston 32. For best results, the area of higher CTE should extend below the integral ring groove 31 well into the piston skirt 36.

The invention can be practiced in other manners than are described herein without departing from the spirit and the scope of the appended claims.

What is claimed is:

1. An improved piston for an internal combustion engine comprising:
    a carbon-carbon piston having a piston skirt and a crown;
    said piston being constructed to include means for a cantilevered seal in the crown of the carbon-carbon piston.

2. An improved piston for an internal combustion engine comprising:
    a carbon-carbon piston having a piston skirt and a crown;
    said piston being constructed to include a cantilevered seal in the skirt of the carbon-carbon piston.

3. An improved piston for an internal combustion engine as in claim 1, wherein said cantilevered seal is incorporated into said crown of said piston by machining an integral ring groove into the circumference of said piston.

4. An improved piston for an internal combustion engine as in claim 1, wherein said cantilevered seal is incorporated into said crown of said piston during casting.

5. An improved piston for an internal combustion engine as in claim 1, wherein said cantilevered seal is incorporated into said crown of said piston by casting an integral ring groove into the circumference of said crown.

6. An improved piston for an internal combustion engine as in claim 1, wherein said cantilevered seal is incorporated into said crown of said engine piston during molding.

7. An improved piston for an internal combustion engine as in claim 1, wherein said cantilevered seal is incorporated into said crown by molding an integral ring groove into the circumference of said crown.

8. An improved piston for an internal combustion engine as in claim 1, wherein said cantilevered seal is larger in diameter than said piston skirt.

9. An improved piston for an internal combustion engine as in claim 1, wherein said cantilevered seal has a higher coefficient of thermal expansion than the rest of said piston so that said cantilevered seal will effect a tighter seal.

10. An improved piston for an internal combustion engine as in claim 1, wherein said cantilevered seal has a lower mechanical modulus than the rest of said piston so that said cantilevered seal will effect a tighter seal.

11. An improved piston for an internal combustion engine as in claim 1, wherein said cantilevered seal is sealed with a coating to reduce friction and to improve wear resistance.

12. An improved piston for an internal combustion engine as in claim 11, wherein said coating is a ceramic coating.

13. An improved piston for an internal combustion engine as in claim 12, wherein said ceramic coating is selected from the group consisting of silicon carbide, chromium carbide and titanium carbide.

14. An improved piston for a compressor comprising:
   a carbon-carbon piston having a piston skirt and a crown;
   said piston being constructed to include means for a cantilevered seal in the crown of the carbon-carbon piston.

15. An improved piston for a compressor comprising:
   a carbon-carbon piston having a piston skirt and a crown;
   said piston being constructed to include a cantilevered seal in the skirt of the carbon-carbon piston.

16. An improved piston for a compressor as in claim 14, wherein said cantilevered seal is incorporated into said crown of said piston by machining an integral ring groove into the circumference of said piston.

17. An improved piston for a compressor as in claim 14, wherein said cantilevered seal is incorporated into said crown of said piston during casting.

18. An improved piston for a compressor as in claim 14, wherein said cantilevered seal is incorporated into said crown of said engine piston during molding.

19. An improved piston for a compressor as in claim 14, wherein said cantilevered seal is larger in diameter than said piston skirt.

20. An improved piston for a compressor as in claim 14, wherein said cantilevered seal is sealed with a coating to reduce friction and to improve wear resistance.

21. An improved piston for an internal combustion engine as in claim 8, wherein said cantilevered seal is larger in diameter than said piston skirt by 0.001 to 0.003 inches.

22. An improved piston for an internal combustion engine as in claim 1, wherein said carbon-carbon piston is formed with a lubricant to permit self-lubrication.

23. An improved piston for an internal combustion engine as in claim 22, wherein said lubricant to permit self-lubrication is graphite.

24. An improved piston for an internal combustion engine as in claim 2, wherein said cantilevered seal is larger in diameter than said piston skirt.

25. An improved piston for an internal combustion engine as in claim 24, wherein said cantilevered seal is larger in diameter than said piston skirt by 0.001 to 0.003 inches.

26. An improved piston for a compressor as in claim 19, wherein said cantilevered seal is larger in diameter than said piston skirt by 0.001 to 0.003 inches.

27. An improved piston for a compressor as in claim 14, wherein said carbon-carbon piston is formed with a lubricant to permit self-lubrication.

28. An improved piston for a compressor as in claim 27, wherein said lubricant to permit self-lubrication is graphite.

* * * * *